United States Patent [19]

Haesebroek et al.

[11] Patent Number: 5,316,683
[45] Date of Patent: May 31, 1994

[54] METAL EXTRACTION BY ION EXCHANGE

[75] Inventors: Guy G. Haesebroek, Mortsel; Achille J. De Schepper, Lichtaart, both of Belgium

[73] Assignee: n.v. Union Miniere s.a., Marcinelle, Belgium

[21] Appl. No.: 937,899

[22] PCT Filed: Apr. 3, 1991

[86] PCT No.: PCT/BE91/00027
§ 371 Date: Oct. 8, 1992
§ 102(e) Date: Oct. 8, 1992

[87] PCT Pub. No.: WO91/17274
PCT Pub. Date: Nov. 14, 1991

[30] Foreign Application Priority Data

Apr. 27, 1990 [BE] Belgium ............... 9000459

[51] Int. Cl.$^5$ .............. C22B 3/00; B01J 45/00
[52] U.S. Cl. .................. 210/688; 423/22; 423/87; 423/89; 423/112; 423/139
[58] Field of Search .......... 210/679, 681, 688; 423/22, 87, 89, 112, 139

[56] References Cited

U.S. PATENT DOCUMENTS

| | | | |
|---|---|---|---|
| 4,085,261 | 4/1978 | Petchornik | 526/19 |
| 4,180,628 | 12/1979 | Marchant | 521/39 |
| 4,215,219 | 7/1980 | Patchornik | 546/179 |
| 4,409,189 | 10/1983 | Borrowman | 423/54 |
| 4,631,177 | 12/1986 | Yotsuyanagi | 423/112 |
| 5,102,512 | 4/1972 | Lamerant | 210/681 |

FOREIGN PATENT DOCUMENTS 0234319 2/1987 European Pat. Off. .
407922 10/1973 U.S.S.R. .

*Primary Examiner*—Ivars Cintins
*Attorney, Agent, or Firm*—Fred Philpitt

[57] ABSTRACT

Process for extracting Ge, Ga, In, As, Sb, Bi, Pt, Pd, Ni, and/or Co from an acid aqueous solution, wherein use is made of a resin with 8-hydroxyquinoline groups, resulting from the reaction of an aminated resin with an aldehyde and 8-hydroxyquinoline, characterized in that the aminated resin itself is obtained by imidoalkylation of a cross-linked styrene-copolymer and an ester or an ether of an N-hydroxyalkylimide and by hydrolysis of the imidoalkylation product.

30 Claims, No Drawings

METAL EXTRACTION BY ION EXCHANGE

The present invention relates to a process for extracting one or more metals selected from the group consisting of GE, Ga, In, As, Sb, Bi, Pt, Pd, Ni and Co from an acid aqueous solution containing said one or more metals, according to which the acid aqueous solution is contacted with a solid ion exchanger at a pH at which the ion exchanger absorbs said one or more metals, said ion-exchanger resulting from the reaction of a carrier material, containing NH— and/or $NH_2$-groups that are able to react with aldehydes, with (a) an aldehyde and
(b) 8-hydroxyquinoline and/or an 8-hydroxyquinoline derivative, and possibly
(c) a swelling agent and/or a solvent.

Such a process is described in SU-A-407922. In this known process indium is extracted from sulfuric acid solutions of pH 1.05 and 2.9 by contacting the solutions with an ion exchanger resulting from the reaction of crosslinked polymers having primary or secondary aminogroups with formaldehyde and 8-hydroxyquinoline in water or alcohol, the aminated crosslinked polymers themselves resulting from either the condensation of amines with epichlorohydrin or the amination of chloromethylated styrene-divinylbenzene-copolymers.

The aim of the present invention is to provide a process such as defined herebefore, which gives better extraction results than the prior art process.

Therefore, according to the invention use is made of an ion exchanger resulting from the said reaction, when the carrier material is one that is obtainable by amidoalkylation, preferably by imidoalkylation with an ester or an ether of a N-hydroxyalkylimide, of a crosslinked styrene-copolymer and by subsequent hydrolysis of the amido- or imidoalkylation product.

The process of the invention is particularly useful for extracting GE, Ga and/or In from $ZnSO_4$ solutions used in the electrowinning of Zinc, for separating As, Bi and Sb impurities from sulfuric acid solutions and for separating Pt or Pd impurities from $AgNO_3$ solutions used in the electrorefining of silver.

As to the preparation of the ion exchanger used in the process of the present invention, the following should be noted.

The carrier material contains preferably at least one reactive group of the general formula

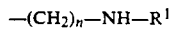
(I)

wherein
$R^1$ = H or a possibly substituted and possibly unsaturated alkylcycloalkyl-or alicyclic rest with 1 to 10 C-atoms-preferably methyl- or a possibly substituted aromatic rest with 6 to 10 C-atoms and
n = 1 or 2.

Carrier materials, wherein $R^1$ = H and n = 1, are especially preferred. A macroporous aminomethylated styrene-divinylbenzenecopolymer is used as a preferred carrier material.

The carrier material can be prepared by a Friedel-Crafts reaction of a crosslinked, water-insoluble organic polymer containing aromatic nuclei, with an imidoalkylation agent in the presence of a swelling agent for the polymer and of an acid catalyst and by subsequent hydrolysis of the imidoalkylated polymer in accordance with DE-PS 2161628 and DE-PS 2418976.

The esters of N-hydroxyalkylimides with lower aliphatic carboxylic acids (DE-PS 2418976) as well as bis-(dicarbonimidialkyl)ethers (DE-PS 2161628) can be used as imidoalkylation agents.

As N-hydroxyalkylimides which can be used there should be mentioned the di-methylimides and di-ethylimides of alphatic $C_4$-$C_6$ dicarboxylic acids and of aromatic o-dicarboxyl acids. The N-hydroxymethylimides are preferably used.

The crosslinked, water-insoluble organic polymers containing aromatic nuclei is preferably an aromatic vinyl compound of the type obtained by the copolymerisation of monovinyl and polyvinyl compounds. Such copolymers are known per se and are obtained by known methods. The copolymer may be either microporous, i.e. has a gel structure, or macroporous.

Preferred copolymers are those which consist of a major amount of aromatic monovinylcompounds and of a minor amount of aromatic or aliphatic polyvinyl compounds.

Suitable swelling agents for the polymer are, above all, halogenated hydrocarbons or polar organic solvents such as nitro compounds.

Suitable catalysts include the usual Friedel-Crafts catalysts, such as $AlCl_3$ or $FeCl_3$ and, especially, sulphuric acid.

The reaction of the organic polymer with the ester of the N-hydroxyalkylamide is carried out at temperatures of 0°–150° C. The ester is used in such quantities that there are from 0.5 to 4 mols of ester per mol of aromatic nuclei in the polymer. The catalyst is generally used in quantities ranging from 0.1 to 1.5 mol per mol of ester.

The reaction can be carried out by initially preparing the ester of the N-hydroxylalkylimide in the swelling agent and swelling the polymer in this solution, whereafter the acid catalyst is added and the mixture is brought to the reaction temperature. On completion of the acylimidoalkylation reaction the acyl radical is split off from the reaction products in a known manner, by subjecting the acylimidoalkylation product to alkaline or acid hydrolysis.

Preferred carrier materials are aminomethyl-polystyrene-divinylbenzene resins with a nitrogen content of 8-12 wt. % in the dry material and with a degree of crosslinking of 2–12%, preferably 4–8%, and useful capacities of 1.5–3.5 equivalent/l, preferably 2.5–3 equivalent/l, in accordance with DE-PS 2418976.

The aldehydes, which can be used for preparing the ion exchanger that is used in the process of the present invention, are those which are suited to undergo the Mannich-reaction with the aminogroups of the carrier material and 8-hydroxyquinolines according to formula III.

These are aldehydes of the general formula:

(II)

in which $R^3$ stands for hydrogen, an alkylrest with 1–4, especially 1–2 C-atoms or a possibly substituted aromatic hydrocarbon rest with 6–10 C-atoms, such as propionaldehyde, butyraldehyde, iso-butyraldehyde, especially formaldehyde, acetaldehyde and benzaldehyde.

The 8-hydroxyquinolines, which can be used for preparing the ion exchanger used in the process of the present invention, are those of the general formula III

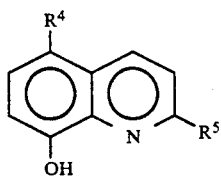

(III)

in which $R^4$=H or a halogen atom or —$SO_3H$ and $R^5$=H or $CH_3$.

Very suitable compounds are those wherein $R^4$=H or chlorine and $R^5$=H.

The synthesis of the ion exchanger is normally carried out in the presence of a swelling agent and/or a solvent. Suitable swelling agents and/or solvents are water, to which acids and bases may be added, as well as $C_1$-$C_4$-alcohols, especially methanol and ethanol.

The synthesis itself consists in reacting the carrier materials (M) with aldehydes and 8-hydroxyquinolines by a Mannich reaction:

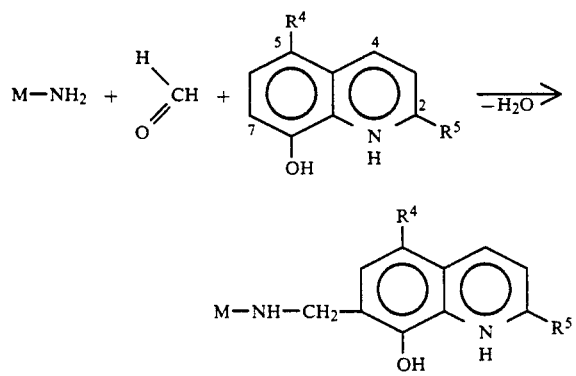

The synthesis is carried out in the reaction conditions which are well known for carrying out Mannich-reactions. The aminomethylation of 8-hydroxyquinolines of formula III then occurs almost selectively at the 7-position.

Preferably, the carrier material is allowed to swell in a solvent or a solvent mixture before the reaction.

The reaction temperature can lie, dependent on the nature of the components, between 20°-100° C., preferably between 20°-80° C. and particularly between 50°-70° C. The reaction time can amount up to 48 h; as a rule, however, it lies between 5 and 24 h.

The molar ratio aldehyde:8-hydroxyquinoline can vary between 2:1 and 1:1, but is preferably about 1-1.5:1. The quantities of aldehyde and 8-hydroxyquinoline depend on the reactive aminogroups that are accessible on the carrier material. They are preferably used in such quantities that all accessible aminogroups undergo the Mannich-reaction. In most cases, a ratio aminogroups:8-hydroxyquinoline of 1:1 to 1:1.5 will be sufficient.

On completion of the reaction the resin is separated, washed with water, possibly in the presence of bases or acids, and/or solvents. The resin, which is so freed from not converted soluble reaction components, can be used directly for the extraction process.

Examples of the preparation of ion exchangers that can be used in the process of the present invention:

4 different aminomethylated styrene-divinylbenzene resins (I, II III and IV), to be used as carrier materials, were prepared in accordance with DE-PS 2418976, example 2, such as described hereunder for resin I:

354 g of N-hydromethylphtalimide, dissolved in 1100 g of dichloroethane, are heated for 5 hours to reflux temperature with 227 g of acetic acid anhydride. 150 g of resin beads made of a macroporous styrene polymer crosslinked with 6% divinylbenzene are swollen in this ester solution for 1 hour at 60° C. 240 g of concentrated sulphuric acid are then added dropwise over a period of 1 hour at reflux temperature and the reaction mixture is then stirred at the same temperature for 20 hours. After the reaction product has been separated off, it is suspended in 1000 ml of a 10% aqueous ammonia solution. The residues of dichloroethane are removed from this suspension by azeotropic distillation. The reaction product is then separated off and hydrolyzed by heating for 10 hours at 180° C. with a 40% sodium hydroxide solution in an autoclave. After filtration and washing the aminomethyl-polystyrene-divinylbenzene resin I is obtained.

The properties of resin I are given in Table 1.

Resins II, III and IV (see Table 1) were prepared in an analogous way.

TABLE 1

| Resin | N-content* in dry material % | Degree of crosslinking % | Capacity** equiv-alent/l | Type of resin |
|---|---|---|---|---|
| I | 11.1 | 6 | 3.0 | macroporous |
| II | 8.9 | 8 | 2.6 | macroporous |
| III | 8.8 | 5 | 2.4 | macroporous |
| IV | 9.1 | 4 | 2.8 | gel structure |

*according to elementary analysis
**the data relate to the moist resins (see DIN 54402, DIN 54408, DIN 54400)
(1) 314 g of the moist aminomethyl-polystyrene-divinylbenzene resin I (corresponding to 100 g of dry material), 165 g of 8-hydroxyquinoline and 470 ml of methanol are stirred for 1.5 hour at 60° C. 50.5 g of p-formaldehyde are then added and the stirring is continued for 5 hours at 60° C. The resin is filtered off. In order to remove not converted reaction components the resin is washed successively with 300 ml of respectively methanol water, 4N $H_2SO_4$, water, 1.5N NaOH and finally with water till the effluent is neutral. The yield of moist resin is 350.6 g, corresponding to 201 g of dry material. The calculated 8-hydroxyquinoline content is 3.2 mol per kg dry resin (see table 2, resin A). The water content is 42.7%.
(2) The conversion of resin I such as described in example (1) is repeated with different reagent ratios, solvents and reaction times, whereby obtaining the resins Aa-Ad (see table 2).

TABLE 2

| Resin | A | Aa | Ab | Ac | Ad |
|---|---|---|---|---|---|
| g 8-hydroxyquinoline | 165 | 165 | 165 | 96 | 165 |
| g p-formaldehyde | 50.5 | 50.5 | 37 | 20 | 50.5 |
| Solvent | $CH_3OH$ | $CH_3OH$ | $CH_3OH$ | $CH_3OH$ | $C_2H_5OH$ |
| Reaction time h | 5 | 24 | 24 | 5 | 5 |
| Yield of dry material in g | 201 | 214 | 192 | 155 | 186 |
| Water content of the resin % | 42.7 | 38.6 | 44.2 | 48.3 | 42.8 |
| Wt. per liter in g/ml* | 0.81 | 0.81 | 0.80 | 0.79 | 0.80 |

TABLE 2-continued

| Resin | A | Aa | Ab | Ac | Ad |
|---|---|---|---|---|---|
| Content $\frac{\text{Mol 8-hydroxyquinoline}}{\text{kg dry material}}$ | 3.2 | 3.4 | 3.1 | 2.3 | 3.0 |

*in accordance with DIN 54408

(3) Resins II, III and IV are converted in the same way as described in example (1) for resin I, whereby obtaining the resins B, C and D (see Table 3).

Resins A, Aa, Ab, Ac, Ad, B, C and D are thus representative of the ion exchangers which can be used in the process of the present invention.

An ion exchanger to be used in the above discussed prior art process was prepared starting from a commercially available amination product of chloromethylated macroporous polystyrene-divinylbenzene resin with a nitrogen content of 6.3%. This aminated resin was subjected to the Mannich-reaction as described in example (1), whereby obtaining ion exchanger E (see Table 3).

TABLE 3

| | To be used in the process of the invention | | | | To be used in the prior art process |
|---|---|---|---|---|---|
| Resin | A | B | C | D | E |
| Starting resin | I | II | III | IV | Commercial macroporous aminomethyl-polystrene-divenylbenzene |
| g 8-hydroxyquinoline | 165 | 165 | 165 | 165 | 160 |
| g formaldehyde | 50.5 | 50.5 | 50.5 | 50.5 | 33 |
| Solvent | $CH_3OH$ | $CH_3OH$ | $CH_3OH$ | $CH_3OH$ | $C_2H_5OH$ |
| Reaction time h | 5 | 5 | 5 | 5 | 40 |
| Yield of dry material in g | 201 | 147 | 171 | 213 | 131 |
| Water content of the resin % | 42.7 | 46.4 | 38.3 | 30 | 58.3 |
| Wt. per liter in g/ml* | 0.81 | 0.77 | 0.78 | 0.87 | 0.75 |
| Content $\frac{\text{Mol 8-hydroxyquinoline}}{\text{kg dry material}}$ | 3.2 | 2.0 | 2.6 | 3.4 | 1.5 |

*in accordance with DIN 54408

The process of the invention is illustrated by the following examples.

EXAMPLE 1

The extraction of Ge, Ga, In, Sb, Bi, Pt, Pd, Ni and Co from acid solutions is carried out by one of the following methods:

Method a:

A quantity of moist resin corresponding to 5 g of dry material is contacted for 3 minutes with 4N $H_2SO_4$, then filtered off and washed until neutral with 2 l of water. The resin is finally washed with solution 1 (see Table 4) and then stirred for 24 h in 110 ml of a solution of the metal (6 g/l of metal ions in solution 1). The metal content of the solution is determined before and after contact of the solution with the resin, by titration or by atomic absorption spectroscopy. Using these data, the metal loading of the resin in g $M^{n+}$/resin is calculated.

When the quantity of metal used in method a is not sufficient for saturating the resin with metal, then method b is used.

Method b:

One operates in the same way as in method a, but instead of using 110 ml of metal solution one uses 220 ml.

For the extraction of expensive metals one uses method c.

Method c:

One operates in the same way as in method a, but one uses a limited quantity of moist resin corresponding to 0.2 g of dry material and a solution of 1 m equivalent of metal in 50 ml of solution 1.

The results are given in Tables 4 and 4a.

TABLE 4

| Metal | $Sb^{3/5+}$ | $Bi^{3+}$ | $Ge^{4+}$ | $Ga^{3+}$ | $In^{3+}$ | $Pd^{2+}$ | $Pt^{4+}$ | $Co^{2+}$ (1) | $Co^{2+}$ (2) | $Ni^{2+}$ (1) | $Ni^{2+}$ (2) |
|---|---|---|---|---|---|---|---|---|---|---|---|
| Solution 1 | HCl | $HNO_3$ | $H_2SO_4$ | $H_2SO_4$ | $H_2SO_4$ | HCl | HCl | $H_2SO_4$ | $H_2SO_4$ | $H_2SO_4$ | $H_2SO_4$ |
| pH | 0.4 | 0.3 | 3 | 2.5 | 3 | 1.2 | 0.0 | 2 | 5 | 2 | 5 |
| Method | b | b | a | a | c | c | c | a | a | a | a |

TABLE 4a

| Metal | $Sb^{3/5+}$ | $Bi^{3+}$ | $Ge^{4+}$ | $Ga^{3+}$ | $In^{3+}$ | $Pd^{2+}$ | $Pt^{4+}$ | $Co^{2+}$ (1) | $Co^{2+}$ (2) | $Ni^{2+}$ (1) | $Ni^{2+}$ (2) |
|---|---|---|---|---|---|---|---|---|---|---|---|
| Resin | Metal loading in g metal/l | | | | | | | | | | |
| A | 113.8 | 123.8 | 44.6 | 46.1 | 58.3 | 133.9 | 131 | 14.4 | 37 | 17.3 | 38.9 |
| B | 95.1 | 95.9 | 33.2 | 35.3 | 47.6 | 109.1 | 107 | — | — | — | — |
| C | 107.5 | 121.9 | 43.7 | — | — | 119.0 | — | — | — | — | — |
| D | 72.0 | 0 | 53.7 | — | — | 13.4 | — | — | — | — | — |
| E (prior art process resin) | 41.5 | 39.7 | 13.0 | 13.6 | 19.5 | 38.4 | 40.0 | 3.4 | — | 13 | — |

EXAMPLE 2

The re-extraction of some metals from resin A is carried out as follows:

Resin A resulting from example 1 is poured into a column and washed with 200 ml of solution 1. The washwater is rejected. The resin is then treated with 500 ml of solution 2 (re-extraction). The metal content of the obtained eluate is determined.

The re-extraction yield (in %) is calculated as follows:

(g of re-extracted metal: g of fixed metal) × 100.

The operation is carried out in downflow at a rate of 2-4 bed volumes per hour.

The results are given in Table 5.

TABLE 5

| Metal | Solution 1 | Solution 2 | Re-extraction yield % |
|---|---|---|---|
| $Co^{2+}$ | pH 5 | 2M $H_2SO_4$ | 62.4 |
| $Ni^{2+}$ | pH 5 | 2M $H_2SO_4$ | 80.8 |
| $Sb^{3+/5+}$ | 1.5M HCl | 4M NaOH | 42.7 |
| $Bi^{3+}$ | pH 0.3 | 5M $H_2SO_4$ | 97 |
| $Ga^{3+}$ | pH 2.5 | 2M $H_2SO_4$ | 88.6 |
| $In^{3+}$ | pH 3 | 2M $H_2SO_4$ | 100 |
| $Ge^{4+}$ | pH 3.5 | 3M KOH | 91 |
| $Pd^{2+}$ | 0.1M HCl | 8M HCl | 84.5 |

We claim:

1. Process for extracting at least one metal selected from the group consisting of Ge, Ga, In, As, Sb, Bi, Pt, Pd, Ni and Co from an acid aqueous solution containing said at least one metal, comprising contacting the acid aqueous solution with a solid ion exchanger at a pH at which the ion exchanger absorbs said at least one metal, said ion exchanger being the reaction product of a carrier material that has been obtained by amidoalkylation of a crosslinked styrene-copolymer and subsequent hydrolysis of the amidoalkylation product, with
   (a) an aldehyde and
   (b) 8-hydroxyquinoline and/or an 8-hydroxyquinoline derivative, and optionally
   (c) a swelling agent and/or a solvent.

2. Process for extracting at least one metal selected from the group consisting of Ge, Ga, In, As, Sb, Bi, Pt, Pd, Ni and Co from an acid aqueous solution containing said at least one metal, comprising contacting the acid aqueous solution with a solid ion exchanger at a pH at which the ion exchanger absorbs said at least one metal, said ion exchanger being the reaction product of a carrier material that has been obtained by imidoalkylation of a crosslinked styrene-copolymer with an ester or an ether of a N-hydroxyalkylimide and subsequent hydrolysis of the imidoalkylation product, with
   (a) an aldehyde and
   (b) 8-hydroxyquinoline and/or an 8-hydroxyquinoline derivative, and optionally
   (c) a swelling agent and/or a solvent.

3. Process according to claim 2 wherein Ge is extracted at a pH below 5.

4. Process according to claim 3 wherein Ge is eluted from the ion exchanger by an aqueous solution of NaOH with a normality of at least 0.1.

5. Process according to claim 2 wherein Ga is extracted at pH 0.5-5.

6. Process according to claim 5, wherein Ga is eluted from the ion exchanger either by an aqueous solution of NaOH with a normality of at least 0.25 or by an aqueous solution of $H_2SO_4$ or HCl with a normality of at least 0.5.

7. Process according to claim 2, wherein Ge, Ga and In are extracted at pH 0.5-2.5.

8. Process according to claim 7, wherein Ge and Ga are eluted from the ion exchanger by an aqueous solution of NaOH with a normality of at least 0.25 and then In is eluted with an aqueous solution of $H_2SO$, or HCl with a normality of at least 0.5.

9. Process according to claim 7, wherein Ga and In are eluted from the ion exchanger by an aqueous solution of $H_2SO_4$ or HCl with a normality of at least 0.5 and then Ge is eluted with an aqueous solution of NaOH with a normality of at least 0.1.

10. Process according to claim 3, wherein the solution from which the metal is extracted is a zinc sulfate solution.

11. Process according to claim 2, wherein In is extracted at pH 0.5-4.

12. Process according to claim 11, wherein In is eluted from the ion exchanger by an aqueous solution of $H_2SO_4$ or HCl with a normality of at least 0.5.

13. Process according to claim 2, wherein Ge and Ga are extracted at pH 0.5-3.

14. Process according to claim 13, wherein Ge and Ga are eluted from the ion exchanger by an aqueous solution of NaOH with a normality of at least 0.25.

15. Process according to claim 13, wherein Ga is eluted from the ion exchanger by an aqueous solution of $H_2SO_4$ or HCl with a normality of at least 0.5 and then Ge is eluted by an aqueous solution of NaOH with a normality of at least 0.1.

16. Process according to claim 2, wherein Ge and In are extracted at pH 0.5-3.

17. Process according to claim 16, wherein In is eluted from the ion exchanger by an aqueous solution of $H_2SO$ or HCl with a normality of at least 0.5 and then Ge is eluted by an aqueous solution of NaOH with a normality of at least 0.1.

18. Process according to claim 2, wherein Ga and In are extracted at ph 0.5-4.

19. Process according to claim 18, wherein Ga and In are eluted from the ion exchanger by an aqueous solution of $H_2SO_4$ or HCl with a normality of at least 0.5.

20. Process according to claim 18, wherein Ga is eluted from the ion exchanger by an aqueous solution of NaOH with a normality of at least 0.25 and then In is eluted by an aqueous solution of $H_2SO_4$ or HCl with a normality of at least 0.5.

21. Process according to claim 2, wherein Sb is extracted at a pH below 1.

22. Process according to claim 21, wherein Sb is eluted from the ion exchanger by an aqueous solution of KOH with a normality of at least 0.1.

23. Process according to claim 2 wherein As, Bi and Sb are extracted from a solution of $H_2SO_4$ with a normality of 1-5.

24. Process according to claim 23, wherein As, Bi and Sb are eluted from the ion exchanger with an aqueous solution of HCl having a pH below 1.

25. Process according to claim 23, wherein As and Sb are eluted from the ion exchanger by an aqueous solution of KOH with a normality of at least 0.1 and then Bi is eluted with an aqueous solution of HCl having a pH below 1.

26. Process according to claim 23, wherein the solution from which As, Bi and Sb are extracted is a copper sulfate solution.

27. Process according to claim 2, wherein Ni and/or Co are extracted at pH 1-7.

28. Process according to claim 27, wherein Ni and/or Co are eluted from the ion exchanger by an aqueous solution having a pH below 1.

29. Process according to claim 2, wherein Pt and/or Pd are extracted from a solution of HCl and/or $HNO_3$ with a normality of 0.01–4.

30. Process according to claim 29, wherein Pt and/or Pd are eluted from the ion exchanger by either an aqueous solution of HCl with a normality higher than 4, or with an aqueous solution of $NH_4OH$ with a normality higher than 0.1, or with an aqueous solution of KSCN with a normality higher than 0.1 or with an aqueous solution of thiourea with a thiourea content of more than 0.1% by weight.

* * * * *